(12) United States Patent
Birkhoelzer et al.

(10) Patent No.: US 7,689,829 B2
(45) Date of Patent: Mar. 30, 2010

(54) METHOD FOR THE ENCRYPTION AND DECRYPTION OF DATA BY VARIOUS USERS

(75) Inventors: Thomas Birkhoelzer, Radolfzell (DE); Frank Krickhahn, Herzogenaurach (DE); Juergen Vaupel, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 986 days.

(21) Appl. No.: 10/785,180

(22) Filed: Feb. 25, 2004

(65) Prior Publication Data

US 2004/0221164 A1    Nov. 4, 2004

(30) Foreign Application Priority Data

Feb. 25, 2003    (DE)    ................. 103 07 996

(51) Int. Cl.
    *H04L 9/32*    (2006.01)
(52) U.S. Cl. .................. 713/182; 713/185; 713/186; 726/2; 726/26; 726/27; 726/28
(58) Field of Classification Search ......... 713/182–186, 713/171; 380/278
    See application file for complete search history.

(56) References Cited

U.S. PATENT DOCUMENTS

| | | | | | |
|---|---|---|---|---|---|
| 5,388,211 | A | * | 2/1995 | Hornbuckle | ................. 717/178 |
| 5,602,918 | A | * | 2/1997 | Chen et al. | ................. 713/153 |
| 5,787,175 | A | * | 7/1998 | Carter | .................. 713/165 |
| 6,031,910 | A | * | 2/2000 | Deindl et al. | ............... 380/255 |
| 6,052,787 | A | * | 4/2000 | Euchner et al. | ................ 726/1 |
| 6,213,391 | B1 | * | 4/2001 | Lewis | .......................... 235/380 |
| 6,789,195 | B1 | * | 9/2004 | Prihoda et al. | .............. 713/182 |
| 6,839,843 | B1 | | 1/2005 | Bacha et al. | |
| 6,941,456 | B2 | * | 9/2005 | Wilson | ........................ 713/160 |
| 6,976,023 | B2 | * | 12/2005 | Chen et al. | ..................... 707/9 |
| 7,006,999 | B1 | * | 2/2006 | Huberman et al. | ............ 705/74 |
| 7,185,194 | B2 | * | 2/2007 | Morikawa et al. | ........... 713/156 |
| 7,212,987 | B2 | * | 5/2007 | Swanke et al. | .................. 705/9 |
| 7,234,059 | B1 | * | 6/2007 | Beaver et al. | ................ 713/170 |
| 7,272,230 | B2 | * | 9/2007 | Sasaki | ........................ 380/278 |
| 7,380,120 | B1 | * | 5/2008 | Garcia | ......................... 713/160 |
| 7,380,271 | B2 | * | 5/2008 | Moran et al. | .................... 726/4 |
| 2002/0101994 | A1 | | 8/2002 | Shinzaki | |
| 2002/0166053 | A1 | * | 11/2002 | Wilson | ........................ 713/189 |
| 2003/0081784 | A1 | * | 5/2003 | Kallahalla et al. | ........... 380/277 |
| 2005/0071658 | A1 | * | 3/2005 | Nath et al. | ................... 713/193 |
| 2007/0055877 | A1 | * | 3/2007 | Persson et al. | .............. 713/171 |

FOREIGN PATENT DOCUMENTS

| | | | |
|---|---|---|---|
| DE | 199 40 977 A1 | 7/2000 | |
| DE | 101 21 819 A1 | 11/2002 | |

* cited by examiner

*Primary Examiner*—Ponnoreay Pich
(74) *Attorney, Agent, or Firm*—Harness, Dickey & Pierce, P.L.C.

(57) ABSTRACT

A method is for the encryption and decryption of data by various users, in which a user is assigned a data key for encrypting and decrypting data. A data processing facility is designed to carry out the method and a storage medium is designed to store information for carrying out the method on a data processing facility. A first step involves the performance of a security check in order to ascertain the identity of the user. A second step involves a data key which cannot be viewed by the user, being assigned on the basis of the result of the security check. In this case, various users who, by way of example, can be associated with a common user group, can be assigned the same data key.

27 Claims, 2 Drawing Sheets

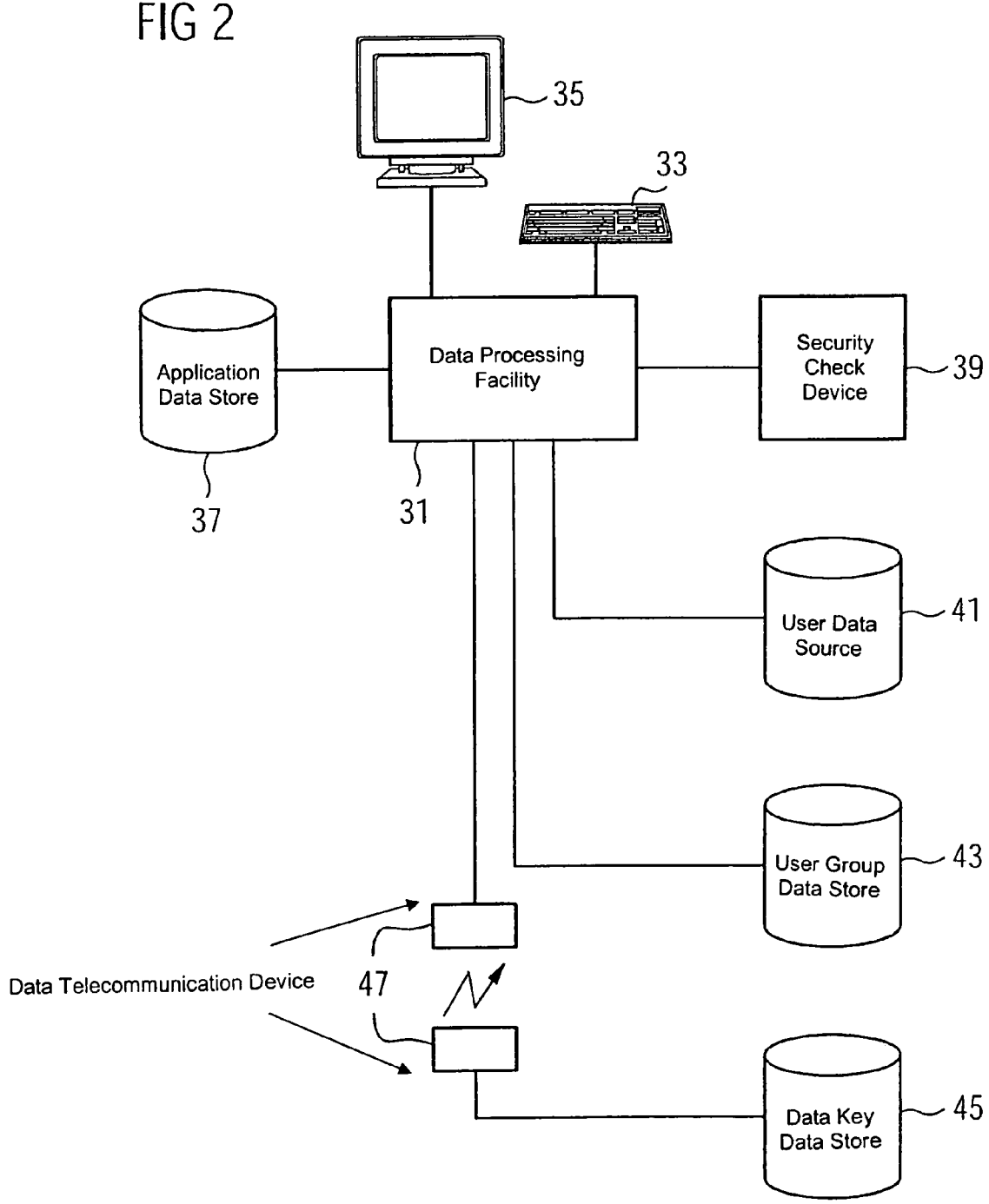

METHOD FOR THE ENCRYPTION AND DECRYPTION OF DATA BY VARIOUS USERS

The present application hereby claims priority under 35 U.S.C. §119 on German patent application number DE 103 07 996.3 filed Feb. 25, 2003, the entire contents of which are hereby incorporated herein by reference.

FIELD OF THE INVENTION

The invention generally relates to a method for the encryption and decryption of data by various users. The invention also generally relates to a data processing facility for carrying out the method and to a storage medium which stores information, e.g. a computer program, for carrying out the method.

BACKGROUND OF THE INVENTION

The increased use of electronic data and communication channels entails constantly growing demands on the protection of data against unwanted data access, but also simultaneously on the ability to access data with the greatest of ease, convenience and the least complexity possible. Particularly on account of the increasing reciprocal networking and the frequently large number of different users who are able to gain physical access to particular data, effective electronic or software-based control and protective mechanisms have become indispensable.

The effective protection of data which can be accessed in diverse ways against unauthorised access plays a significant role. A large number of encryption mechanisms using symmetrical or asymmetrical data keys are known, of which the encryption programs such as PGP, which operate on the basis of asymmetrical key systems, are probably among the securest and most convenient to handle and are therefore used most widely. Both symmetrical and asymmetrical key systems are based on the use of at least one individual data key, which must be accessible only to the authorised user for the purpose of encrypting and decrypting his data. Access to this individual key needs to be protected from unauthorised users as effectively as possible.

The protection of electronic data from unauthorised access plays a particularly significant role for person-related data such as address lists or customer data, for data in the financial sector and particularly for data in the health sector. In the health sector, where the most stringent demands are placed on data integrity, data protection provisions demand that any user of data be clearly identified and authenticated. Authentication refers to a user's authentication being awarded on the basis of his identification, wherein only authenticated users can obtain access to the data in question. In the health sector, the authentication function is also called "access control".

In addition to authentication, in security-critical data applications, e.g. in telemedicine or in home care systems, any communication over fundamentally nonsecure communication channels and any storage of security-critical data require encryption. When using encrypted data, it may be necessary for a plurality of different users to be able to access the data. This may be the case, by way of example, when customer data are being managed by the employees of a bank, in the case of personal data in personnel departments, in the case of joint use of data in development teams or in the case of data in the health sector which should be accessible to a plurality of treating physicians or to a particular group of medical specialist personnel. In this case, there is the problem that data which have been encrypted by a particular user using his individual data key cannot be decrypted by other users using other individual data keys.

To make the encrypted data available nevertheless to particular user groups for the purpose of joint use, it is often customary to communicate the data key required for this purpose to all users. Distributing the key to the user group causes considerable problems for data integrity, since the key needs to be communicated to a large number of people who are involved, and since the fact that it is difficult to memorise data keys which are effective for security purposes means that it is not unusual for these data keys to be kept in an inappropriate manner, e.g. on notepaper in desk drawers. The central management of the keys also makes it necessary to keep key logs, "code logs", whose ability to be spied out represents a further security problem factor.

SUMMARY OF THE INVENTION

An object of an embodiment of the invention is to simplify the secure handling of data keys for a plurality of different users for the purpose of using common encrypted data.

An embodiment of the invention achieves an object by a method, by an apparatus and/or by a storage medium having information, e.g. a computer program, for carrying out the method.

An embodiment of the invention is based on the insight that the ability to encrypt and decrypt jointly used data is not person-related, but rather group-related. Each user of the encrypted data for joint use is thus no longer identified as person but rather on the basis of his association with a group.

A basic concept of an embodiment of the invention involves people who have joint use of encrypted data not being assigned user-specific data keys for accessing the data. Instead, such people are assigned a common user group data key on the basis of their association with a user group. All members of the user group can use the user group data key to encrypt and decrypt data which are intended for joint use. The data key is automatically assigned but is not communicated to the users, i.e. the users receive no knowledge of the actual nature of the data key. Accordingly, they neither need to remember the data key nor are they able to communicate it. This rules out significant security problem factors associated with conventional key systems.

In addition, this affords the further advantage that changes in the personnel making up a user group do not necessitate changes to the data key. In particular, it is not necessary to introduce a new data key when individual people leave the user group, since these people have no knowledge of the nature of the data key which they might misuse in some way after they have left the group. Instead, they are simply no longer assigned a valid data key if they attempt to access data.

In addition, the use of an automatically assigned user group data key means that the data key can be made as complex as desired and can be changed as often as desired. It is down to the encryption system to recode the encrypted data stocks automatically, i.e. to decrypt them using the old data key, to encrypt them again using the new data key, and to assign the new user group data key to the users at a time appropriate to the conversion. This eliminates any complexity for communicating the new data key and for timing its introduction, which rules out further risks to the security of the encryption system.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein:

FIG. 2 shows a system architecture which is suitable for implementing an embodiment of the invention.

DETAILED DESCRIPTION OF THE PREFERRED EMBODIMENTS

Figure 1:
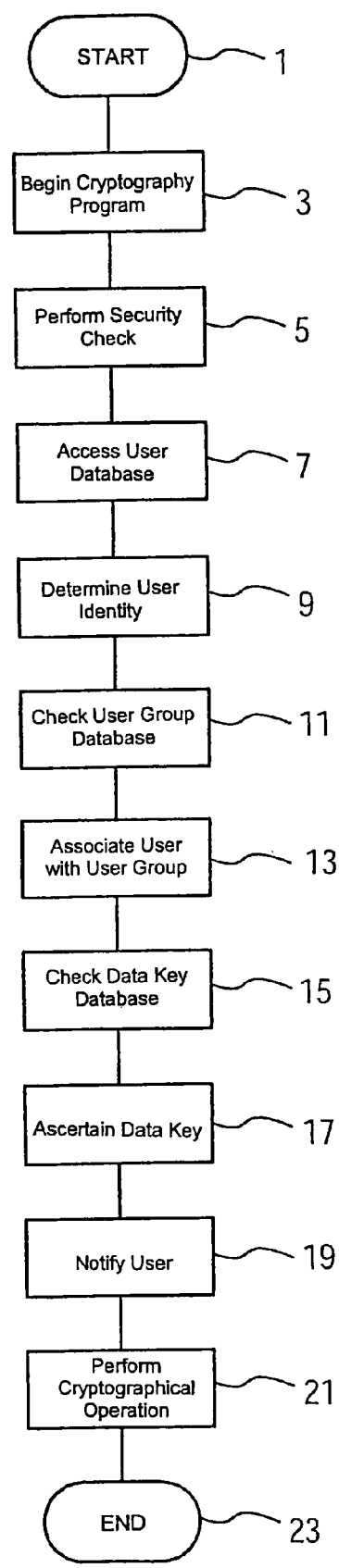
FIG. 1 shows a flowchart with the method steps required for implementing an embodiment of the invention.

FIG. 1 shows the method steps which are required for implementing an embodiment of the invention. The method starts in step 1 by requiring data access which necessitates the use of a cryptography program for the encryption or decryption of data. In step 3, the cryptography program is started. Depending on the application, the cryptography program can be started by the user himself or can be started automatically from an application program.

In step 5, a security check is performed which is intended to be used to identify the user as a really existing person. To this end, the user is asked for person-specific data which must satisfy all the demands on data integrity. Preferably, the security check is performed by way of biometric detection of characteristic data which are as deception-proof as possible, such as a finger print or a form of the iris. It is also possible for the user to identify himself using an electronic chip card or using an electronic or mechanical key.

In step 7, the cryptography program accesses a user database. The user database stores information which can identify the user using the data which has previously been ascertained in the security check in step 5.

In step 9, the cryptography program takes the data from the security check and the data from the user database check as a basis for ascertaining the identity of the user. The degree of proof against deception when ascertaining the user identity is in this case essentially dependent on the security check's proof against deception in step 5 and also on the data integrity of the user database.

In step 11, the cryptography program checks a user group database. This contains data which allow the user to be assigned to a user group on the basis of his previously ascertained user identity. The user group database thus contains information about groups of users having the same level of authorisation. Such groups can be, for example, practice teams made up of medical specialist personnel, members of financial institutes, members of personnel departments or research teams. A common feature of all of these groups is that they work with the same person-specific or object-specific, security-critical data, which although they must be accessible to all team members, must under no circumstances be able to accessed elsewhere.

In step 13, the user may be associated with a user group. Association with a group can be obtained either on an object-related basis, i.e. from the need for particular users to be able to work with a particular data stock, or on a subject-related basis, i.e. from the respective user's hierarchic authorisation or confidentiality classification allowing him basic access to data on a particular security level on the basis of his position in the organisation. Furthermore, a user may belong to a plurality of user groups representing, by way of example, a plurality of practice teams in which the user is simultaneously collaborating. In such cases, the user automatically has access to various, different data stocks.

In step 15, the cryptography program checks a data key database. The data key database contains information which allows particular data keys to be assigned to particular users or user groups.

In step 17, the cryptography program ascertains the data key(s) to be assigned from the previously ascertained user group and the data in the data key database.

In step 19, the cryptography program notifies the respective user of his data key(s). This process takes place without being able to be viewed by the user, since the cryptography program uses the ascertained data key(s) directly for encrypting or decrypting application data. In particular, the user is provided with no information about the nature of the assigned data keys. One or more data key(s) is/are assigned automatically and unnoticed by the user as the result of the security check.

In step 21, the cryptography program performs the requested cryptographical operation, that is to say it encrypts or decrypts data for use by the user or by another application program started by the user. In step 23, the complete cryptography process has ended and the user is logged off from the encryption system again.

The method for carrying out an embodiment of the invention has been described on the basis of the use of three different databases, a user database, a use group database and a data key database. The three databases represent the logical associations between information which need to be made in the course of the encryption method. First, the user needs to be identified as the result of the security check; secondly, the identified user needs to be associated with a user group; and thirdly, the data key belonging to this user group needs to be ascertained.

The use of three databases gives the encryption system a modular structure with the greatest possible flexibility. Changes can be made in each of the three databases at any time independently of the other two databases. In the user database, it is possible to change the security-critical information used to identify the user on a regular basis. In the user group database, it is possible to make changes to the groups, that is to say to the people intended to have joint use of data stocks, which reflect actual changes in the association between individual people and user teams. In the data key database, changes can be made to the data keys on a regular basis in order to increase the security of the system. In this connection, it is respectively necessary to recode the data stock, i.e. to decrypt it using the old data key and to encrypt it with the new data key which is to be introduced.

Although the modular structure with three databases correctly represents the actual logical associations, it is naturally possible to use just two or else just one database system instead.

FIG. 2 shows an electronic data processing facility 31 on which the method for implementing an embodiment of the invention can be carried out. The data processing facility 31 has a keyboard 33 or other input unit and also a screen 35. Depending on the type of application, audible input and output signals can also be processed. The type and scope of the input and output units are of no importance to the implementation of the invention. The data processing facility has access to an application data store 37 which is used for storing preferably encrypted application data. The electronic data processing facility can either be a medical workstation, e.g. a "modality", or any other workstation with a screen, e.g. a bank terminal.

The data processing facility 31 is connected to a security check device 39 which is used to ascertain data for the purpose of identifying the respective user. The security check device 39 can include a chip card reader which reads a user-specific chip card. It may also be a mechanical or electronic lock requiring a user-specific key. Not least, it may be a sensor for ascertaining biometric data from the user, for example measuring the form of the user's iris, his fingerprints or his voice frequency range. The use of biometric data for the security check has the advantage that it is not necessary to use any kind of key or card which the user might lose or which might be stolen from him. In addition, biometric data's proof against deception can be regarded as being higher than that of other key systems.

The data processing facility 31 also has access to a user data store 41 which contains information for identifying users on the basis of the data ascertained by the security check means 39. These data allow the system to identify the respective user as a really existing person.

The data processing facility 31 also has access to a user group data store 43 which contains data which can be used to establish association between users and user groups. By checking these data, the system is able to establish that user group or those user groups to which a previously identified user belongs.

The data processing facility 31 also has access to a data key data store 45 which contains data which can be used to find data keys assigned to users and user groups. The data key data store obviously contains the most security-critical information in this system in as much as it contains all the data keys which can be used to decrypt data in the application data store 37.

For the data key data store 45, particular security requirements apply which can make it appropriate for this data store to be set up centrally at a remote location. For this purpose, the data processing facility 31 accesses the data key data store 45 using a data telecommunication device 47. The remote placement of the data key data store 45 firstly allows it to be isolated from the data processing facility 31 and hence allows the isolation of any other data processing facilities which may be networked to the data processing facility 31. Secondly, it allows particularly stringent security precautions to be put in place specifically for the data key data store 45, such as particularly restrictive firewalls.

Depending on security precautions, the data telecommunication device 47 can have a protected or an unprotected communication channel. In addition, the communication channel for the data telecommunication device 47 may be completely disabled and may be opened only on the basis of the result of the security check by the security check device 39; this can be done using a telephone modem connection, for example.

Depending on the organisation of the work which is to be carried out using the data processing facility, the various data stores 37, 41, 43, 45 may all be separate or may be partially or fully combined. Dispensing with the modular structure having individual data stores and with the remote arrangement of the data key data store 45, it is possible, by way of example, for all the relevant data to be stored in a single local memory in the data processing facility 31, e.g. its hard disk. On the other hand, by way of example, the user group data store 43 may have been set up in a management department which is responsible for organising the workflows and for compiling the user groups, whereas the data key data store 45 may be in an information technology department which is responsible for implementing and realising the encryption system, and finally the user data store 41 may be in an identification location which is responsible for personal data and for detecting and verifying person-specific identification or security data.

The only fundamental aspect of the electronic data processing facility for implementing an embodiment of the invention is that the security check by the security check device 39 allows no inference of the data key which the encryption system uses to encrypt and decrypt application data. This isolation forms the basis for the ability to assign a data key for encrypting and decrypting data which evades direct access by the user and cannot be viewed by him. Instead, the user uses a single logon process on the system for the purpose of automatically obtaining the data key(s) defined by his group association for the purpose of accessing the encrypted data.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic data processing method comprising:
performing, by a security check device, a security check to ascertain a user identity by comparing entered identity information with stored user identity data;
associating the user identity with a user identifier stored in a first data store;
associating the user identifier with at least one user group identifier stored in a second data store;
selecting a user group identifier and acquiring at least one data key associated therewith from a centralized third data store including all available keys, wherein the at least one user group identifier and the at least one data key are associated with one another; and
performing, by at least one processor, at least one of encrypting and decrypting data using the acquired at least one data key and inhibiting user recognition of the acquired at least one data key; wherein
the data are medically relevant,
users include personnel within a medical facility, and
common user group identifiers are assigned the same data key.

2. The method as claimed in claim 1, wherein the security check involves at least one of checking a user-specific biometric data, an electronic key and a mechanical key.

3. The method as claimed in claim 1, wherein a plurality of data keys are simultaneously assignable to one user identifier.

4. The method of claim 1, wherein a user identifier associated with a common user group identifier is assigned the same data key.

5. A computer-readable storage medium including computer executable instructions that, when executed, cause a computer to carry out the method as claimed in claim 1.

6. A method for at least one of encryption and decryption of data, comprising:
performing by a security check device, a security check to ascertain user identity by comparing entered identity information with stored user identity data;
associating the user identity with a user identifier stored in a first data store;
associating the user identifier with a user group including a plurality of users such that a data key for at least one of encrypting and decrypting the data is assigned to a user based on the group with which the user identifier is associated, the same data key being assignable to the plurality of users; and
at least one of encrypting or decrypting the data, by at least one processor, using the assigned data key, wherein
the data are medically relevant,
the plurality of users include personnel within a medical facility, and
common user group identifiers are assigned the same data key.

7. The method as claimed in claim 6, wherein the security check involves checking biometric data of the user.

8. The method as claimed in claim 6, wherein the security check involves checking at least one of an electronic and mechanical key, which are user-specific.

9. The method as claimed in claim 6, wherein the data key is ascertained by comparing the user identity data obtained in the security check with content of a data key memory.

10. The method as claimed in claim 9, wherein the data obtained in the security check are compared with the content of the data key memory using a data telecommunication device.

11. The method as claimed in claim 6, wherein a plurality of data keys are simultaneously assignable to one user.

12. The method of claim 6, wherein users associated with a common user group are assigned the same data key.

13. A computer-readable storage medium including computer executable instructions that, when executed, cause a computer to, carry out the method as claimed in claim 6.

14. An electronic data processing system comprising:
   a security check device to ascertain user identity stored at a first data store and to retrieve at least one user identifier and associated user identity data;
   a second data store for storage and retrieval of the at least one user identifier and associated at least one user group identifier;
   a centralized third data store for storage and retrieval of all available data keys, the centralized third data store including at least one associated user group identifier matched with at least one associated data key; and
   at least one processor to ascertain a user identifier by comparing data of the security check device and the first data store, to ascertain at least one user group from the second data store, to ascertain at least one data key for at least one user group from the third data store, and for performing at least one of encrypting and decrypting data using the at least one data key; wherein
   the data are medically relevant,
   users include personnel within a medical facility, and
   common user group identifiers are assigned the same data key.

15. The system as claimed in claim 14, wherein the at least one data key is accessible using a data telecommunication device.

16. The electronic data processing system as claimed in claim 14, wherein the security check device reads biometric data from a user.

17. The electronic data processing system as claimed in claim 14, wherein the security check device uses at least one of an electronic and mechanical key, which are user specific.

18. The electronic data processing system as claimed in claim 14, wherein the system uses a data telecommunication device to access the third data store.

19. The electronic data processing system as claimed in claim 14, wherein the system is a medical workstation for handling medically relevant data.

20. The system of claim 14, further comprising:
   a fourth data store for storage and retrieval of encrypted data.

21. The system of claim 14, wherein at least one of the first data store, the second data store and the fourth data store are combined.

22. The system of claim 14, wherein data entry and retrieval is at least one of manual and automated.

23. The system of claim 18, wherein the data telecommunications device is removably and operatively associated with a computer network for transfer of data.

24. The system of claim 14, wherein the at least one processor accesses the centralized third data store through a channel via one of an access and restriction process.

25. The system of claim 24, wherein the channel access and restriction process functions operatively with the security check device.

26. The system of claim 14, wherein the first data store comprises:
   mechanical memory, electronic memory, and magnetic and optical media data storage.

27. The system of claim 14, wherein the third data store is isolated from the first, second and fourth data stores.

* * * * *